United States Patent [19]

Qureshi et al.

[11] Patent Number: 5,169,710
[45] Date of Patent: Dec. 8, 1992

[54] FIBER-REINFORCED COMPOSITES TOUGHENED WITH POROUS RESIN PARTICLES

[75] Inventors: Shahid P. Qureshi, Alpharetta; Richard E. Hoffman, Cumming; Richard H. Newman-Evans, Alpharetta, all of Ga.

[73] Assignee: Amoco Corporation, Chicago, Ill.

[21] Appl. No.: 750,964

[22] Filed: Aug. 28, 1991

Related U.S. Application Data

[63] Continuation-in-part of Ser. No. 606,770, Oct. 31, 1990, abandoned, and Ser. No. 511,791, Apr. 20, 1990, which is a continuation of Ser. No. 219,209, Jul. 15, 1988, abandoned.

[51] Int. Cl.$^5$ .......................... B32B 7/00; B32B 9/00; B32B 5/16; D04H 1/00
[52] U.S. Cl. .................................... 428/246; 428/245; 428/283; 428/288; 428/289; 428/290; 428/294; 428/408; 428/475.5; 428/902; 523/457; 523/458; 528/172
[58] Field of Search ............... 428/294, 408, 902, 245, 428/246, 283, 288, 289, 290, 475.5; 528/172; 523/457, 458

[56] References Cited

U.S. PATENT DOCUMENTS

| | | | |
|---|---|---|---|
| 4,831,061 | 5/1989 | Hilaire et al. | 521/56 |
| 5,028,478 | 7/1991 | Odagiri et al. | 428/283 |

FOREIGN PATENT DOCUMENTS 0252725  2/1988  European Pat. Off. .

OTHER PUBLICATIONS

"Tough Resin/Carbon Fibre Composites", Muraki et al., *High Tech—The Way Into The Nineties*, edited by K. Brunsch et al. Elsevier Science Publishers, B. V., Amsterdam 1986, pp. 163–176, This paper was first presented at the 7th International Conference, SAMPE European Chapter, Jun. 1986, Paris, France.

*Primary Examiner*—George F. Lesmes
*Assistant Examiner*—James D. Withers
*Attorney, Agent, or Firm*—Richard J. Schlott; Robert J. Wagner; Frank J. Sroka

[57] ABSTRACT

Layered, fiber-reinforced composites toughened by the use of thermosetting matrix resins including rigid particles are improved in toughness when the particles are porous and have a spheroidal spongy structure, are formed of a polyamide. The method of the invention is particularly effective in improving the toughness of composites based on thermoset matrix resins, and particularly epoxy resins.

14 Claims, No Drawings

FIBER-REINFORCED COMPOSITES TOUGHENED WITH POROUS RESIN PARTICLES

CROSS REFERENCE TO RELATED APPLICATIONS

This application is a continuation-in-part of application Ser. No. 07/606,770, filed Oct. 31, 1990, now abandoned, and application Ser. No. 07/511,791, is now pending filed Apr. 20, 1990, which is a continuation of application Ser. No. 07/219,209, filed Jul. 15, 1988, now abandoned.

BACKGROUND OF THE INVENTION

This invention relates to composite materials and more particularly to tough, impact resistant fiber-reinforced composites. Still more particularly, this invention relates to methods for toughening fiber-reinforced composites and to particles useful in toughening such composites.

Fiber-reinforced composites are high strength, high modulus materials which are finding wide acceptance for use in sporting goods and in producing consumer items such as appliances. Composites are also finding increased acceptability for use as structural components in automotive applications, as components of buildings and in aircraft. When used in structural applications the composites are typically formed of continuous fiber filaments or woven cloth embedded in a thermosetting or thermoplastic matrix. Such composites may exhibit considerable strength and stiffness, and the potential for obtaining significant weight savings makes them highly attractive for use as a metal replacement.

The composites industry has long been involved in finding ways to further improve the mechanical properties of composite materials used in structural applications. Considerable effort has been expended over the past two decades directed toward the development of composites with improved fracture toughness. Inasmuch as most of the commonly employed matrix resins, as well as many of the reinforcing fibers, are generally brittle, much of that effort has gone into a search for components having better toughness characteristics. As a consequence, the search for toughened matrix resins has become the subject of numerous recent patents and publications, and numerous formulations have been made available to the composite industry through these efforts.

The methods used for toughening engineering resins have been adapted for the toughening of the matrix resins commonly used in composite structures, as shown for example by Diamant and Moulton in "Development of Resin for Damage Tolerant Composites - A Systematic Approach", 29th National SAMPE Symposium, Apr. 3-5, 1984. The forming of alloys and blends by adding a more ductile thermoplastic such as a polysulfone to an epoxy resin formulation has also been shown to improve the ductility of the epoxy resin and provide enhanced toughness, according to British patent 1,306,231, published Feb. 7, 1973. More recently, combinations of an epoxy resin with terminally functional thermoplastics were shown to exhibit enhanced toughness. See U.S. Pat. No. 4,498,948. Still more recently, curable combinations of epoxy resins and thermoplastics with reactive terminal functionality were also said to improve the toughness of specifically formulated matrix resins, provided that the neat resin after curing exhibits a specific phase-separated morphology having a cross-linked glassy phase dispersed within a glassy continuous phase. See U.S. Pat. No. 4,656,208. Further improvements are said to be achieved by including a reactive rubber component which is said to be contained within the cross-linked dispersed glassy phase. See U.S. Pat. No. 4,680,076. Still more recently, the use of an infusible particle made from a rubber dispersed within the phase-separated cross-linked epoxy resin matrix has been suggested for toughening composites based on such matrix resins. See U.S. Pat. No. 4,783,506.

Although the addition of rubber, thermoplastics and the like generally improves the ductility and impact resistance of neat resins, the effect on the resulting composites is not necessarily beneficial. In many instances the increase in composite toughness may be only marginal, and a reduction in high temperature properties and in resistance to environmental extremes such as exposure to water at elevated temperatures is frequently seen.

An alternative approach to producing toughened composites has been the development of layered composite structures having layers formed of fibers imbedded in a matrix resin alternated with layers formed of a thermoplastic resin, described in Japanese patent application 49-132669, published May 21, 1976. More recently, in U.S. Pat. No. 4,604,319, there were disclosed layered fiber-resin composites having a plurality of fiber-reinforced matrix resin layers inter-leafed with thermoplastic layers adhesively bonded to the reinforced matrix resin layers. Inter-leaf structures are ordinarily produced by impregnating continuous fiber to form prepreg, then laying up the composite by alternating prepreg with sheets of thermoplastic film. The laid-up structure is then subjected to heat and pressure, curing the matrix resin and bonding the layers. The patent also discloses inter-leaf layers which comprise a thermoplastic filled with a reinforcing material such as chopped fibers, solid particles, whiskers and the like.

Although inter-leafed composite structures with improved toughness have been disclosed, there has been some sacrifice in other physical properties, including a reduction in glass transition temperatures together with an increase in creep at high temperatures. Further difficulties with such composites may include a loss in stiffness for many such compositions, adhesive failure that may occur between layers formed of dissimilar resins and property deterioration during use due to poor solvent resistance. In addition, prepregs based on thermoplastic resin generally are lacking in tack, which complicates their fabrication into composites and increases the degree of skill needed to fabricate complex structures. This may in turn result in increased scrap losses and a need for more complex quality control procedures, increasing manufacturing costs in order to achieve an acceptable level of reliability.

Recently, the use of an infusible particle made from a rubber dispersed within a phase-separated cross-linked epoxy resin matrix has been suggested for toughening composites based on such matrix resins. See U.S. Pat. No. 4,783,506. Dispersing rigid particulate modifiers in the matrix resin has also been disclosed in the art for toughening composite materials, and has been described for example in published European Patent Applications 0 274,899 and 0 351,025 as well as in U.S. Pat. No. 4,863,787, the teachings of the latter three references are hereby incorporated by reference.

The compositions and methods presently available for producing toughened composites thus require further improvement. Composites having improved resistance to impact and particularly those with better compressive strength after impact would be a useful advance in the art, and reliable methods for producing such toughened composites could find rapid acceptance, displacing the more complex and expensive manufacturing processes currently available for these purposes.

SUMMARY OF THE INVENTION

The present invention is directed to layered composite structures comprising continuous fiber and a matrix resin formulation, and more particularly to improved layered composite structures comprising continuous fiber embedded in a matrix resin formulation toughened with a particulate modifier, the improvement comprising the use of a particulate modifier having an essentially spheroidal, spongy structure, also described as porous polyamide particles, and to a method for producing toughened layered composite by incorporating porous polyamide particles in the matrix resin within the inter-ply spacing of the layered composite before curing. The resulting composite structures exhibit a marked and unexpected improvement in toughness.

DETAILED DESCRIPTION

The improved composite structures of this invention comprise discrete layers formed of continuous fiber embedded in a matrix resin, the layers being separated or spaced normally apart by laminar regions or layers comprising matrix resin filled with finely-divided polyamide resin in the form of particles having an essentially spheroidal, spongy structure, also described as porous polyamide particles.

The Matrix Resins

The matrix resins useful in forming toughened composites according to the practice of this invention are the resin formulations commonly used in the fiber-reinforced composites art and may include both thermosetting and thermoplastic materials. However, thermosetting resins will be preferred for most applications and the thermoset resins disclosed to be useful in the practice of this invention will include those most commonly employed for making fiber reinforced composites such as epoxy resins, cyanate resins, bismaleimide resins, BT resins comprising a combination of cyanate and bismaleimide resin components, mixtures of such resins and the like, as well as the widely used cross-linkable polyester resins. Many thermoset resins generally possess low ductility and consequently are quite brittle, and composite structures based on such resins are therefore greatly benefited when toughened according to the teachings hereof.

The preferred matrix resin formulation will thus be based on a thermoset resin, and particularly preferred are the well known and widely used epoxy formulations comprising in general an epoxy resin and an appropriate curing agent such as a diamine hardener or the like. The epoxy formulations may optionally include an appropriate curing accelerator and such additional components as are commonly employed in the thermoset composite art.

The epoxy resins which may be employed are curable epoxy resins having a plurality of epoxy groups per molecule. Such resins are commonly employed for producing composite materials, and many are readily available from commercial sources. Examples of such resins are polyglycidyl compounds, including the reaction products of polyfunctional compounds such as alcohols, phenols, carboxylic acids, aromatic amines or aminophenols with epichlorohydrin, and epoxidized dienes or polyenes. Further examples include diglycidyl ethers of diene-modified phenolic novolacs, cycloaliphatic epoxides such as the reaction products of polyfunctional cycloaliphatic carboxylic acids with epichlorohydrin, cycloaliphatic epoxides, cycloaliphatic epoxy ethers and cycloaliphatic epoxy esters and the like. Mixtures of epoxy resins may also be used. Preferred epoxide include Bisphenol A epoxides, epoxy novolacs, cycloaliphatic epoxy ethers and glycidyl amines. A wide variety of those epoxy resins are available from commercial sources under trade names such as PGA-X from Sherwin Williams Company, DEN 431 and Tactix 56 from Dow Chemical Company, Glyamine 125 from F.I.C. Corp. and RD87-160, XU MY-722 and MY-720 from Ciba-Geigy Corp.

Diamine hardeners which may be used include the aromatic diamines conventionally employed in formulating epoxy resins, such as for example, 4,4'-diaminodiphenyl ether, 4,4'-diaminodiphenyl methane, 4,4'-diaminodiphenyl sulfone, 3,3'-diaminodiphenyl sulfone, p-phenylene diamine, m-phenylene diamine, 4,4'-bis(aminodiphenyl) propane, 4,4'-diaminodiphenyl sulfide, trimethylene glycol bis(p-aminobenzoate) and the like, as well as their various position isomers. Also useful are the variety of polynuclear aromatic diamine hardeners such as those disclosed for example in U.S. Pat. Nos. 4,579,885 and 4,517,321, and U.S. Pat. No. 4,686,250, all incorporated herein by reference, as well as xylylene diamine, bis(aminomethyl) cyclohexane, dicyandiamide and the like. The various diamine hardeners may be used alone or in combination.

Suitable epoxy resin formulations may be prepared according to methods and practices well known and widely used in the resin art. Generally the matrix resin formulations will comprise greater than 2 parts by weight (pbw) diamine hardener per hundred parts by weight epoxy resin. Although the particular level selected will depend upon the particular diamine employed, preferably at least 3 pbw and more preferably from about 6 to about 150 pbw diamine hardener per hundred pbw epoxy resin will be used. The amount of each component selected will depend upon the molecular weights of the individual components and the molar ratio of reactive amine (N-H) groups to epoxy groups desired in the final matrix resin system. For most prepreg and composite applications, sufficient diamine hardener will be used to provide a molar ratio of N-H groups to epoxide groups in the range of from about 0.3/1 to 1.8/1, preferably from 0.4/1 to 1.3/1.

The formulations may further include a thermoplastic polymer to impart improved toughness of the resulting composite by increasing the ductility and impact resistance of the cured resin formulation. When dissolved in the formulation prior to curing, thermoplastics may also increase the viscosity and film strength of the uncured resin thereby improving the resin processability for use in impregnating operations, and can provide prepreg with better handling characteristics for use in composite fabrication. A variety of thermoplastics are known in the art for use in combination with epoxy resins, including for example polyaryl ethers such as polyaryl sulfones and polyaryl ether sulfones, polyether ketones, polyphenylene ethers and the like, as well as polyarylates, polyamides, polyamide-imides, polyether-imides, polycarbonates, phenoxy resins and the like. Where the purpose for including the thermoplastic is to improve viscosity, processability and handling characteristics, the thermoplastic selected will necessarily be soluble in the uncured epoxy resin formulation. The proportion of thermoplastic employed will depend in part upon the thermoplastic selected and the particular end use envisioned. However, for most purposes, the formulation will comprise from 0 to 30 pbw of thermoplastic per 100 pbw of the combined diamine hardener and epoxy resin components.

The epoxy formulations may additionally include an accelerator to increase the rate of cure. The accelerators will be selected from those known and used in the epoxy resin art may be employed in conventional amounts. Accelerators which may be found to be effective include Lewis acid:amine complexes such as $BF_3$:monoethylamine, $BF_3$:triethanolamine, $BF_3$:piperidine and $BF_3$:2-methylimidazole; amines such as imidazole, 1-methyl imidazole, 2-methyl imidazole, N,N-dimethylbenzylamine and the like; acid salts of tertiary amines such as the p-toluene sulfonic acid:imidazole complex and the like, salts of trifluoromethane sulfonic acid such as FC-520 (obtained from 3-M Company), organophosphonium halides, dicyandiamide, 4,4'-methylene bis(phenyldimethyl urea) and 1,1-dimethyl-3-phenyl urea. Mixtures of such accelerators may also be employed. For some end uses it may also be desirable to include dyes, pigments, stabilizers, thixotropic agents and the like, and these and other additives may be included as needed at levels commonly practiced in the composite art. Upon curing, the matrix resin formulations, exclusive of any particulate additives, fillers and reinforcement which may be employed, will form a substantially single, continuous rigid phase.

The Fibers

Prior to curing, the matrix resin formulation will be combined with continuous fiber reinforcement or structural fibers and the particulate modifier that will be used in forming toughened composites according to the practice of this invention. Suitable fibers may be characterized in general terms as having a tensile strength of greater than 100 kpsi and a tensile modulus of greater than two million psi. Fibers useful for these purposes include carbon or graphite fibers, glass fibers and fibers formed of silicon carbide, alumina, titania, boron and the like, as well as fibers formed from organic polymers such as for example polyolefins, poly(benzothiazole), poly(benzimidazole), polyarylates, poly(benzoxazole), aromatic polyamides, polyaryl ethers and the like, and may include mixtures comprising two or more such fibers. Preferably the fibers will be selected from glass fibers, carbon fibers and aromatic polyamide fibers such as the fibers sold by the DuPont Company under the trade name Kevlar. The fibers may be used in the form of continuous tows of typically from 500 to 42,000 filaments, as continuous unidirectional tape or as woven cloth.

The Particulate Modifiers

The polyamide resin particles disclosed for use in toughening composites according to the practice of this invention will be porous. More particularly, the particles comprise a polyamide resin and have an essentially spheroidal, spongy structure. The porous polyamide particles generally have a mean diameter between 1 and 75 microns, preferably from about 1 to about 30 microns, and still more preferably from about 2 to about 25 microns.

An essential characteristic of the particles useful in the practice of this invention is that they are highly porous, that is, the porous polyamide particles comprise internal pores and have a high surface area, substantially greater than would be observed for smooth, spherical particles or irregular particles obtained by crushing a brittle substance. Various methods may be used for demonstrating and measuring their porosity. For example, powder formed of such porous polyamide particles will have a large specific surface, ordinarily substantially greater than 5 $m^2/g$, and preferably a specific surface greater than about 9 $m^2/g$, while ordinary smooth particles have a specific surface on the order of 1–2 $m^2/g$. Particles found to be particularly useful for the purposes of this invention generally will have a specific surface greater than about 9 $m^2/g$. The effectiveness of particles for improving composite toughness appears to improve with further increase in porosity, at least over the range of particle porosity that has been examined, and no upper limit for effectiveness has yet been determined. Particles with a very high specific surface greater than about 30 $m^2/g$ and even as great as 64 $m^2/g$ are also found to be useful in the practice of this invention, and the preferred range may thus be described as from about 9 to about 80 $m^2/g$. The specific surface for such powders is determined according to the classical BET method.

Particle porosity may also be demonstrated and determined by other techniques. For example, pore volume may be considered a measure of porosity for such particles and the polyamide particles useful in the practice of this invention typically have bulk pore volumes, determined as intrusion volume on the particles in bulk form, of greater than about 2 $cm^3/g$ and preferably greater than about 3 $cm^3/g$. Particles with bulk pore volumes as great as 3.5 $cm^3/g$ or even greater will also be effective. Smooth spherical particles, on the other hand, have bulk pore volumes on the order of 1.1–1.8 $cm^3/g$.

Measurement of porosity as intrusion volume of the bulk particles will necessarily include the interstitial space of the bulk particles. The value may be corrected to exclude the interstitial space or interparticle volume for the bulk material and thus provide the intrusion pore volume for the particles as a further characterization of the porous particles. The pore volume of particles useful in the practice of this invention determined by this method will be found to be well above 0.3 cm3/g. Particles with pore volumes determined by this method of at least 0.4 cm3/g and as great as 0.6 cm3/g and even greater will be found to be highly effective for toughening composites and such particles will therefore be particularly preferred.

It will be understood that porous polyamide particles in other physical forms such as flake, cylindrical polyamide particles or fibrid-like materials may also be useful in the practice of the invention. However, methods for producing porous particles in these alternate forms are not readily available, and such forms are not preferred.

The porous polyamide particles useful in the practice of this invention may be formed of any rigid polyamide. The polyamide selected will have, in its final particle form, sufficient thermal resistance, hardness and rigidity to resist being melted, compressed or flattened under the pressures and temperatures that will be encountered during the fabricating and curing of the laminate. In addition, the polyamide will be selected to be substantially insoluble in the matrix resin formulation prior to gelation, in order to preserve the unique surface characteristics of the particle.

The polyamide resins that may be used will include any of the readily available nylon resins such as polycaprolactam (nylon 6), poly(hexamethylene diamine sebacamide (nylon 6,6), polyundecanoamide (nylon 11), polydodecanoamide (nylon 12) and the like. The preparation of particles from such resins with the requisite porosity has been described in the art, for example in U.S. Pat. No. 4,831,061, the teachings of which are incorporated herein by reference, as well as in U.S. Pat. No. 2,359,877 and in Japanese published application 62-240325. A variety of porous polyamide particles as well as porous nylon-coated particulates such as titanium dioxide particles which may be suitable for use in the practice of this invention are available from commercial sources.

The particulate modifiers used in the fabrication of composites may comprise only the porous polyamide particles of this invention or may be mixtures of such particles with non-porous particles formed for example from a cross-linked rubber or from a rigid resin such as polystyrene, polyphenylene ethers, polysulfones or the like, including any of the wide variety of particulate modifiers that are known in the art for use in toughening composites.

The use of resin particles for toughening of composite materials has been disclosed, for example in published European patent applications 0 274,899 and 0 351,025 as well as in U.S. Pat. No. 4,863,787. The particulate modifiers used in the fabrication of composites according to the art include those comprising a finely divided rigid resin such as a thermoset resin, including cured formulations based on epoxy resins, phenolic resins, melamine resins and the like. Also suitable are thermoplastic resin particles, which may be formed from any of the widely-available rigid thermoplastics known in the art, including the engineering resins such as polyamides, polyimides, polyamide-imides, polyarylates, polycarbonates, polyaryl ethers, polyaryl ketones, polyaryl sulfones and the like, as well as many of the more rigid molding resins and textile fiber resins widely available, including polyacrylonitrile, polyvinyl chloride, cellulosic resins, methylmethacrylate resins and the like.

Although polyamide particles are among the particles that have been suggested in the art for use in producing particle-toughened composites, the art does not teach the use of porous particles for these purposes. Indeed, the art has recognized that the use of fine particles has a detrimental effect on the handling characteristics and has sought to overcome these effects by such techniques as minimizing the surface area of the particles. For example, it has been noted in published European Patent Application 0 274 899 that the addition of fine particles to matrix resin formulations increases the resin viscosity. According to the further disclosure of this European Patent Application, the observed increase in viscosity results from the increase in surface area that occurs as a consequence of reduction in particle size. As is well known, a high resin viscosity makes it difficult to coat the resin or to produce prepreg by forming resin films using a coating process. The reference recommends avoiding such high surface area particles, turning instead to fine particles that are formed spherically to minimize surface area. The use of spherical particles with minimized surface area greatly suppresses the effect on matrix resin viscosity and gives a viscosity increase of less than 1:2 compared with formulations incorporating particles having an indefinite shape and higher surface area such may be obtained by crushing a rigid resin.

The porous particles employed in the practice of this invention are produced specifically to be highly porous and have a very large surface area, far greater than for particles produced for example by crushing operations. A substantial increase in resin viscosity, on the order of from three- to five-fold, is generally observed for matrix resin formulations comprising these highly porous particles.

The Composite Structures

The toughened composite structures of this invention comprise discrete layers formed of continuous fiber embedded in a matrix resin, the layers or plies being separated or spaced normally apart, the layer surfaces defining laminar regions or spacing layers comprising matrix resin filled with the porous polyamide particles. The particles serve to separate the plies, and the thickness of the ply spacing will thus be directly related to the particle size.

As used herein, the term "particle size" refers to the particle dimension determining the ply separation, which for small, irregular or substantially spherical particles is ordinarily the particle diameter. Inasmuch as it will not be practical in most instances to obtain particles uniform in size throughout, the particulate modifiers will ordinarily comprise mixtures of particles encompassing a variety of particle sizes. The particle size may be determined by any of the variety of standard methods, such as by use of a Coulter counter or "Multisizer" apparatus, or by a Granulometer device. Particle modifiers useful and effective in toughening composites according to the practice of this invention have the majority of the particles with a mean diameter lying in the range of from 1 to about 75 microns. Mixtures of powdered particulate materials suitable for the purposes of this invention may be obtained by classifying particle mixtures using well-known methods such as screen classification and the like.

Use of particulate mixtures comprising a wide variety of particle sizes may have other detrimental effects and therefore be less preferred. Dispersing mixtures of particles in the matrix resin formulation uniformly may be made more difficult by the presence of very large particles, and the coating characteristics of the filled resins will be more variable. The presence of a small number of very large (>50 micron) particles widely dispersed in the film of uncured filled matrix resin adhered to one or both surfaces of a prepreg tends to create significant peaks or high spots at the outer surface. The presence of such high spots has the effect of an apparent surface roughness, reducing the surface tack of the prepreg by preventing full and effective contact between layers in a layup operation. The reduced tack will be particularly noticeable for particle mixtures that comprise a wide distribution of particle sizes, hence, narrowly disperse particle mixtures will be preferred.

The proportion of each component employed in fabricating the toughened composites of this invention will depend in part upon the end use envisioned, as well as on the particular resin, fiber and resin particles selected.

Overall, the composites will comprise from about 20 to about 80 wt % continuous fiber, the balance comprising matrix resin and particles, with the particles amounting to from 1 to about 25 wt % based on combined weight of the particles and the matrix resin formulation. Although the level of resin particles needed to toughen the composite will lie within the stated range, the optimum level will necessarily vary depending upon the type of matrix resin, the fiber loading, the particle type and similar factors, and must therefore be determined for the particular fiber and resin system employed. In general, it will be desirable to employ the lowest level of particles that will impart the desired improvement in composite toughness. Although greater than optimum levels may be employed, further improvements in toughness will be marginal, and other physical properties such as hot/wet strength may be detrimentally affected. Composites having a very high fraction of the particles located in the interply spacing are believed to be most effective in providing improvements in toughness at a minimum level of particles.

Composite Fabrication

Methods ordinarily used for the production of layered composites may be readily adapted for fabricating the composites of this invention. Most commonly, such composites are formed from impregnated tape comprising uniformly disposed, parallel filaments of continuous fiber, or from resin-impregnated fabric woven from continuous fiber tow. These impregnated fiber structures, designated prepreg, may be produced by impregnating tape or fabric with matrix resin formulation in an uncured state using any convenient method including melt coating, calendaring, dip impregnation with a resin solution or molten resin, melt pressing the tape or fabric into a film of the matrix resin or the like.

The composite will then be formed by laying up sheets or tapes of the prepreg to form a layered stack or lay-up, and curing the lay-up, usually with heat and under pressure. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

In forming the toughened composites of this invention, it will be necessary to distribute the porous polyamide particles uniformly between each of the prepreg layers. A variety of methods may be used for this purpose, and the placing of particles at a surface of the prepreg may be carried out as a separate step prior to or during the lay-up operation, or integrated into the step of impregnating the tape or woven fabric. The former will be referred to as two-step processes, while the latter are termed one-step processes.

Methods for carrying out the two-step process include physically distributing the particles by a sprinkling, spraying, spreading or similar operation on a surface of each prepreg tape or sheet during the lay-up operation; dispersing the particles uniformly in liquid matrix resin formulation and coating the mixture on a surface of the prepreg; forming a film of particle-filled matrix resin formulation and inter-leafing the prepreg layers with the film during the lay-up operation and the like. Two-step methods based on a coating or inter-leafing step provide added matrix resin, ensuring that adequate matrix resin is available to fill the laminar region between the plies formed by the particles.

In the alternative one-step method, the particles may be placed on a surface of the prepreg during the impregnation step by dispersing the particles into the matrix resin and then carrying out the impregnation step. In this process, a fiber structure having a surface layer of the filled resin may be formed, for example, by placing a film of filled resin on a surface of tape or fabric or by coating the filled resin directly onto the surface. The continuous fiber is then embedded in the matrix resin by heating the fiber-and-resin structure in a melt-pressing or ironing operation. The matrix resin becomes molten and a portion flows into the fiber structure, leaving behind at the tape or fabric surface matrix resin filled with those particles too large to enter the interstices of the fiber structure.

The one-step process may be viewed as a filtering operation whereby the fiber structure acts as a filter, passing matrix resin while retaining at the surface those particles larger than the openings between the fibers.

As previously noted, other than the adaptations needed to introduce the particles, the lay-up and curing steps used in preparing the toughened composite structures will be conventional. These process steps may be carried out using any of the variety of conventional processing devices and equipment and employ such conventional process steps, adaptations and modifications as are ordinarily employed in the composite art.

The invention will be better understood by consideration of the following Examples, which are provided by way of illustration. In the Examples, all parts are by weight, and all temperatures are given in Centigrade unless otherwise noted.

EXAMPLES

The following materials and formulations are employed in the Examples.

Epoxy-1: A mixture of tetraglycidyl derivatives of aromatic amines comprising about 40 mole % N,N,N',N'-tetraglycidyl-bis(4-amino-3-ethyl-phenyl)methane, about 47 mole % (4-diglycidylamino-3-ethyl-phenyl)-(4-diglycidylaminophenyl) methane and about 12 mole % N,N,N',N'-tetraglycidyl-bis(4-aminophenyl) methane. An epoxy obtained as RD 87-160 from Ciba-Geigy.

Tactix 556: A mixture of oligomeric polyglycidyl ethers of polycyclic bridged hydroxy-substituted polyaromatic compounds. An epoxy obtained as Tactix 556 from Dow Chemical Company.

MY9612 N,N,N'N'-tetraglycidyl-4,4'-methylene dianiline. An epoxy resin obtained as MY 9612 from Ciba Geigy MY0510: O,N,N-triglycidyl p-aminophenol. An epoxy resin obtained as MY 0510 from Ciba Geigy.

3,3'-DDS: 3.3'-diaminodiphenyl sulfone. An aromatic diamine hardener, obtained as HT-9719 from Ciba Geigy.

4,4'-DDS: 4,4' diaminodiphenyl sulfone. An aromatic diamine hardener, obtained as HT 9664 from Ciba-Geigy Omicure 94: N,N-dimethyl-N'-phenyl urea, cure accelerator obtained from Omicron Chemicals.

PEI: Polyether imide thermoplastic resin obtained as Ultem 1000 from the General Electric Company PES: Polyether sulfone thermoplastic resins, obtained from ICI, Ltd. Various grades were used, including Victrex 200, 4100P and 5003P ERR 4205: Bis(2,3-epoxycyclopentyl) ether, from Union Carbide Corporation.

SED-m: 4,4'-bis(3-aminophenoxy)diphenyl sulfone, from Mallinkrodt Chemical Company BAPP: 2,2-bis(4-(4'-aminophenoxy)phenyl) propane, from Mallinkrodt Chemical Company BF$_3$.TEA: Boron trifluoride-triethanolamine complex from Englehard Industries

Fibers

Carbon fiber: Thornel® T 40 grade carbon fiber from Amoco Performance Products, Inc. This fiber typically has a filament count of 12,000 filaments per tow, a yield of 0.44 g/m, a tensile strength of 810 kpsi, a tensile modulus of 42 mpsi and a density of 1.81 g/cc.

In the Examples, ribbon formed from the fiber was used to prepare prepreg having fiber areal weights of 140 to 150 g/m$^2$.

Test Procedures

Particle sizes were determined by Granulometer, and are given as average particle size, while BET surface area was determined by Krypton BET technique and Pore volume was determined by mercury porosimetry.

Compression After Impact Test (CAI). This procedure, referred to as the Compression After Impact test or CAI, is generally regarded as a standard test method in the industry. The test specimens are panels measuring 6 in. × 4 in., cut from 32 ply fiber-reinforced composite sheets. The panels are first impacted by being subjected to an impact of 1500 in-lbs/in at the center in a Gardner Impact Tester, using a ⅝ in. diameter indenter; a panel thickness of 0.177 in. was assumed. The impacted panel is then placed in a jig and tested edgewise for residual compressive strength. The details are further described in "NASA Contractor Report 159293", NASA, August, 1980.

The methods of the following Examples are representative of those that may be employed for preparing the resin formulations, prepreg and composites useful in the practice of this invention. The processes will be generally recognized by those skilled in the art as processes and methods commonly employed for the production of thermoset resin formulations and composites.

EXAMPLE 1

An epoxy resin formulation was prepared by heating 70.5 parts by weight (pbw) of MY9612 epoxy in a flask to 110° C. while stirring, and then adding 29.5 pbw of 4,4' DDS diamine hardener and mixing at 110° C. for 20 min. The mixture was cooled to 103° C. and 15 g of porous nylon 12 particles having an average particle size of 10 microns, BET surface area of 18.2 m$^2$/g, a pore volume of 3.42 cm$^3$/g and a pore volume excluding interparticle porosity of 0.66, were added with vigorous stirring. After a total 20 min. of stirring, the resin was discharged from the reaction vessel and cooled.

A second preparation of the formulation was carried out, but omitting the particles. Prepreg was then prepared by a two-step method, with the particulate modifier dispersed on one side thereof, substantially according to the processes described herein. The prepreg had a fiber areal weight of 149 g/m$^2$ and a resin content of 38 wt %. The 12" prepreg tape was then laid up into 15"×15" laminates using a ply configuration of [+45/90/−45/0]$_{4s}$ and then cured in an autoclave under 90 psi pressure at 355° C. for 2 hr. The resulting composite panel, after cooling, was used to provide test specimens for CAI evaluation. The data are summarized in Table 1.

CONTROL EXAMPLE A

An epoxy resin formulation was prepared substantially by the process of Example 1, but substituting non-porous nylon 12 particles having an average particle size of 8 microns and BET surface area of 1.7 m$^2$/g, and a pore volume of 1.10 cm$^3$/g (obtained as SP-500 particles from Toray Industries) as the modifier.

The thermosetting epoxy formulation was used to prepare composites substantially as described in Example 1 for further evaluation. The composite composition and property data are summarized in Table I.

EXAMPLE 2

An epoxy resin formulation was prepared by heating a solution of 25.4 pbw of MY0510 epoxy and 37.3 pbw of MY9612 epoxy in 37.5 pbw of methylene chloride to 45° C. The mixture was stirred and methylene chloride was distilled while adding 15 pbw Victrex 4100P PES polyether sulfone. The stirred mixture was further heated to remove methylene chloride, finally to a reduced pressure of 28 in. and a temperature of 110° C. and held at that temperature for 1 hr. The 3,3'-DDS, 21.5 pbw, was then added over a 5 min. period and the mixture was then stirred at 100° C. for 1 hr., under a vacuum of 28 in. to remove residual solvent. The temperature was reduced to 90° C. and 0.2 pbw of the Omicure 94 was added, stirring was continued for 5 min. and the resin was discharged.

The resin was used as a base resin to prepare prepreg and composite by the two-step method using the porous nylon 12 particles of Example 1, following substantially the process described in Example 1. The resin and particles were combined in the sigma blade mixer at about 50° C., and blended for about 2 hr. at 50°–75° C. to complete the dispersion of the particles. The final prepreg tape had a fiber areal weight of 145 g/m$^2$ and a resin content of 37.3 wt %. Composite specimens were prepared as in Example 1. The composite composition and property data are summarized in Table I.

CONTROL EXAMPLE B

The resin of Example 2 was combined with non-porous nylon 12 particles of Control Example A and used to provide composite for comparison tests by following substantially the same process. The final prepreg tape had a fiber areal weight of 145 g/m$^2$ and a final resin content of 37 wt %. The composite composition and property data are summarized in Table I.

EXAMPLE 3

ERR-4205 epoxy resin, 42.0 pbw, was placed in a resin kettle and heated with stirring to 130° C. before adding 8.0 pbw PEI. Heating was continued for 30 min. until a homogeneous solution was obtained, then 34.8 pbw of SED-m were added and the mixture was cooled to 105° C. and held. When the mixture was again homogeneous, 14.3 pbw BAPP were added and heating was continued at 105° C. for 10 min. before cooling the mixture to 80° C., adding 0.9 pbw BF$_3$.TEA, mixing for an additional 10 min. and then discharging.

An interleaf formulation was prepared from a portion of the resin by charging 2131 pbw of the frozen resin to a sigma mixer, mixing the resin until the temperature reached 35° C., about 15 min., and then adding 291 pbw of the porous nylon 12 particles of Example 1. The mixture reached a temperature of 45° C. while mixing was continued for about 15 min. to disperse the particles.

A prepreg was prepared from the filled and unfilled resins by the two-step process, and then formed into a composite specimen substantially as described herein. The composite composition and property data are summarized in Table I.

CONTROL EXAMPLE C

An epoxy resin formulation was prepared substantially by the process of Example 3 and using the same base resin formulation, substituting nonporous nylon 12 particles of Control Example A as the particulate modifier. A prepreg was prepared from the filled and unfilled resins by the two-step process, and then formed into a composite specimen substantially as described herein. The composite composition and property data are summarized in Table I.

EXAMPLE 4

A mixture of 800 g of Tactix 556 epoxy resin and 800 g of Epoxy-1 epoxy resin was placed in a 5 liter resin flask and heated to 110° C. A solution of 165 g of PEI thermoplastic dissolved in 3000 g of methylene chloride was added with stirring over a 1.5 hr. period, and then solvent was removed. The mixture was degassed by heating and stirring the mixture at 110° C. and vacuum for 45 min. to remove residual solvent before adding 590 g of 3,3'-DDS and stirring for 25 minutes to disperse the diamine. The resin was then discharged and cooled.

A sample of the resin, 86 pbw, was charged to a sigma blade mixer and allowed to warm to room temperature. Porous nylon 12 particles of Example 1, 14 pbw, were added and the mixture was sheared for about 60 min. to disperse the particles uniformly, giving a resin temperature of about 70° C. A film of the filled resin was prepared at a coating weight of 33 g/m$^2$ and combined using a prepreg machine with separately-prepared prepreg tape having a fiber content of 77 wt % and a fiber areal wt. of 145 g/m$^2$, prepared from carbon fiber and the unfilled resin by substantially following the procedures of Example 1. The final prepreg tape had a fiber content of 37 wt % and a fiber areal weight of 145 g/m$^2$, with Nylon 12 particles dispersed in the resin coating on one surface. Composites were prepared substantially by the procedures of Example 1 to provide test panels having a panel thickness of 0.197 in. The composite property data are summarized in Table I.

CONTROL EXAMPLE D

An epoxy resin formulation was prepared substantially by the process of Example 4 and using the same base resin formulation, substituting non-porous nylon 12 particles of Control Example A as the particulate modifier. A prepreg was prepared from the filled and unfilled resins by the two-step process, and then formed into a composite specimen substantially as described herein. The composite composition and property data are summarized in Table I.

TABLE I

| Example No. | Particles[1] | CAI[2] Kpsi |
| --- | --- | --- |
| 1 | Porous nylon | 32.7 |
| Control A | Non-porous nylon | 28.0 |
| 2 | Porous nylon | 48.8 |
| Control B | Non-porous nylon | 43.5 |
| 3 | Porous nylon | 47.8 |
| Control C | Non-porous nylon | 42.8 |
| 4 | Porous nylon | 47.6 |
| Control D | Non-porous nylon | 28.0 |

Notes:
[1]For particle composition and porosity description, see text.
[2]CAI = Compression After Impact, 1500 in-lb./in. impact. For test procedure, see text.

It will be apparent from a consideration of the CAI test data presented in Table I that a variety of epoxy compositions are substantially improved in damage tolerance when porous particles are employed as modifiers. Compare the CAI results for Examples 1–3, prepared using porous Nylon 12 particles, with those of Control Examples A–C made with non-porous Nylon 12 particles. The improvement is generally about 5 Kpsi, considered to be a surprising and very substantial increase in damage tolerance by those skilled in the art. Consider also the excellent CAI properties of the composite of Example 4 compared with the properties of Control D, unchanged from the CAI for an equivalent composite made without a particulate modifier.

EXAMPLE 5

Additional prepregs were prepared using an epoxy formulation comprising 26 pbw MY9612 epoxy resin, 41.4 pbw epoxidized novolac resin (obtained as DEN 431 epoxy resin from Dow Chemical Company), 7 pbw polysulfone (obtained as Udel P-1800 polysulfone from Amoco Performance Products, Inc.), 25 pbw trimethylene glycol di-(4-amino)benzoate diamine hardener and 0.6 pbw Omicure 94. The resin formulation was prepared by heating the epoxy components and the polysulfone to dissolve the thermoplastic, then adding the diamine hardener, cooling the resin and discharging it. The resulting formulation was combined with Thornel ® T 650-35 grade carbon fiber from Amoco Performance Products, Inc. and used to form a prepreg.

Composite made by the two-step process as in the previous examples, when toughened with approximately 14 wt. % porous nylon particles having an average particle size of 16 microns, a BET specific surface of 64 m$^2$/g, a bulk pore volume of 3.22 cm$^3$/g and a pore volume excluding interparticle porosity of 0.61 g/cc, had a CAI value of 42 Kpsi.

A one-step composite made from the same formulation had a CAI value of 45 Kpsi.

EXAMPLE 6

A two-step composite was made substantially according to the procedures of Example 5, but substituting the porous nylon 12 particles as shown in Example 1. The resulting composite had a CAI value of 43 Kpsi. A single-step composite made from this formulation gave a CAI value of 40 Kpsi.

CONTROL E

A control composite was made by the single-step process following substantially the procedures of Example 5, but using substantially non-porous nylon particles having an average particle size of 10 microns, a BET specific surface of 5.0 m$^2$/g, a bulk pore volume of 1.73 cm$^3$/g and a pore volume excluding interparticle porosity of 0.20. The control composite had a CAI value of 28 Kpsi, substantially the same as that of a composite prepared without particles.

From the CAI results of the composite materials of Examples 5 and 6 with those of the composites of Control Example E it will be apparent that the composites toughened with highly porous polyamide particles exhibit very substantial improvement in composite toughness over composites made with substantially non-porous particles or with no particles. It will be understood that the effectiveness of porous particles can vary, and particles obtained by different processes, even though highly porous, may not be equivalent in performance when employed as tougheners for different resin systems.

EXAMPLE 7

An epoxy formulation was prepared by combining 59.3 pbw DEN 431 epoxidized novolac and 10.5 pbw phenoxy resin (obtained as UCAR PKHH from Union Carbide Company) and heating until the thermoplastic was dissolved, cooling the mixture and then adding 8.8 pbw solid diglycidyl bisphenol A (obtained as DER 661 from Dow Chemical Company) followed by a paste comprising 5.4 pbw of liquid diglycidyl bisphenol A (obtained as GY 6010 from Ciba-Geigy), 4.1 pbw dicyandiamide and 1.9 pbw Omicure 94. The formulation was toughened with 10 wt. % porous nylon 12 particles according to Example 1, combined with Thornel® T 300 grade carbon fiber from Amoco Performance Products, Inc. in a one-step process to prepare prepreg, and used in forming composites substantially as described in the previous examples. The composites had a CAI of 35 kpsi.

CONTROL F

A control composite was made by the single-step process following substantially the procedures of Example 7, but using substantially non-porous nylon particles having an average particle size of 10 microns, a BET specific surface of 5.0 m²/g and a bulk pore volume of 1.73 cm³/g as in Control Example E. The control composite had a CAI value of 26 Kpsi, substantially the same as that of a composite prepared without particles.

Additional preparations of prepreg and composites were made following the procedures of Example 2, substituting porous nylon 12 particles with bulk pore volumes ranging from 2.01 to 3.49 g/cc, pore volumes excluding interparticle porosity ranging from 0.32 to 0.71 g/cc and average particle sizes ranging from 8 to 20 microns. The composite properties are summarized in Table II.

TABLE II

| Example No. | Nylon 12 Particle | | | CAI[4] Kpsi |
|---|---|---|---|---|
| | Partic. size[1], microns | Bulk Poros.[2], cm³/g | Partic. Poros.[3], cm³/g | |
| 2 | 10 | 3.42 | 0.66 | 48.8 |
| 8 | 17 | 2.22 | 0.37 | 43–45 |
| 9 | 25 | 2.01 | 0.32 | 42–45 |
| 10 | 10 | 1.73 | 0.20 | 43 |
| 11 | 40 | 1.15 | 0.10 | 40 |
| Control B | 8 | 1.10 | — | 43.5 |
| 12[5] | 21 | 3.94 | 0.48 | 47.6 |
| 13[5] | 25 | 3.49 | 0.71 | 47–48 |

Notes:
[1] Ave. particle size. For method, see text.
[2] Bulk porosity, by intrusion volume on bulk particle samples; see text.
[3] Determined by correction of value for bulk porosity for interparticle space; see text.
[4] CAI = Compression After Impact, 1500 in.-lb./in. impact. For test procedure, see text.
[5] Matrix resin according to Example 2, made with Victrex 50003P PES in place of Victrex 4100P.

Although all composites summarized Table II showed at least some improvement in CAI value over composites without particles, those toughened with particles having a bulk pore volumes greater than about 3 cm³/g and pore volumes excluding interparticle porosity greater than about 0.4 cm³/g exhibited substantial improvement, usually more than 5 Kpsi, in CAI value over equivalent composites made with the nonporous particles such as those employed for Control Example B.

The effectiveness of porous polyamide particles for toughening composites according to the practice of this invention has been demonstrated by illustrative examples and comparison examples of composites made from a wide variety of thermoset resin formulations. The invention will thus be seen to be an improved fiber reinforced composite or composition comprising discrete layers formed of continuous structural fiber embedded in a matrix resin, the toughening of the composite being accomplished by including in the matrix resin component polyamide particles having an essentially spheroidal, spongy structure. The polyamide particles generally have a mean diameter between 1 and 75 microns, preferably from about 1 to about 30 microns, and still more preferably from about 2 to about 25 microns and may be further characterized as having a large internal pore volume. Powder formed of such particles will have a large specific surface, ordinarily greater than 5 m²/g and preferably greater than about 9 m²/g, determined according to the classical BET method. The particles may be further characterized as having a bulk pore volume greater than about 3 cm³/g, and a pore volume excluding interparticle porosity of greater than about 0.4 cm³/g. The invention will also be recognized to include an improved method for toughening fiber reinforced composites comprising continuous structural fiber embedded in a thermoset matrix resin having a particulate modifier dispersed therein, the improvement being the use of porous particles as defined.

Further modifications and variations will become apparent to those skilled in the resin formulating and composite fabricating art, and such variations and modifications will be included within the scope of the invention as defined by the appended claims.

We claim:

1. A fiber-reinforced composition comprising continuous carbon fiber and porous rigid polyamide particles embedded in an epoxy matrix resin, said particles having a mean diameter in the range of from 1 to about 75 microns, a specific surface greater than about 9 m²/g, and a bulk pore volume greater than 2 cm³/g.

2. The composition of claim 1 wherein said polyamide particles have a bulk pore volume greater than 2 cm³/g and a particle pore volume excluding interparticle space of greater than 0.3 cm³/g, determined by intrusion volume.

3. A layered, fiber-reinforced composite comprising continuous carbon fiber embedded in an epoxy matrix resin and forming a plurality of discrete plies defining layers comprising thermoset matrix resin, said epoxy matrix resin having dispersed therein porous rigid polyamide particles having a spheroidal spongy structure, a mean diameter in the range of from about 1 to about 75 microns a specific surface of greater than about 9 m²/g, a bulk pore volume greater than 2 cm³/g and a particle pore volume excluding interparticle space of greater than 0.3 cm³/g, determined by intrusion volume.

4. The composite of claim 3 wherein said polyamide particles have a mean diameter in the range of from about 1 to about 30 microns and a specific surface of from about 5 m²/g to about 80 m²/g, a bulk pore volume greater than 2 cm³/g and a particle pore volume excluding interparticle space of greater than 0.4 cm³/g, determined by intrusion volume.

5. The composite of claim 3 wherein the bulk pore volume of said porous rigid polyamide particles is greater than 3 cm³/g, determined by intrusion volume.

6. The composite of claim 3 wherein said porous rigid polyamide particles comprise from 1 to about 25 wt % of said matrix resin.

7. The composite of claim 3 wherein said matrix resin comprises at least one epoxy resin and an aromatic diamine hardener.

8. The composite of claim 3 wherein said matrix resin comprises at least one epoxy resin and from about 6 to about 150 pbw, per hundred pbw of the epoxy resin components, of an aromatic diamine hardener.

9. The composite of claim 3 wherein said matrix resin comprises at least one epoxy resin, an aromatic diamine hardener and from about 5 to about 30 pbw, based on combined weight of epoxy resin and diamine hardener components, of a thermoplastic selected from the group consisting of polyaryl ethers and polyether imides.

10. The composite of claim 3 comprising from about 20 to about 80 wt % of said continuous carbon fiber.

11. In a toughened layered, continuous fiber-reinforced composite structure comprising continuous carbon fiber reinforcement and rigid particles embedded in a cured epoxy resin matrix, the improvement wherein said rigid particles are formed of polyamide and have a mean diameter in the range of from about 1 to about 30 microns and a specific surface of from about 5 m²/g to about 80 m²/g, a bulk pore volume greater than 2 cm³/g and a particle pore volume excluding interparticle space of greater than 0.4 cm³/g, determined by intrusion volume.

12. The composite structure of claim 11 wherein said rigid particles are formed of Nylon 12.

13. The composite structure of claim 11 wherein said rigid polyamide particles comprise from about 1 to about 25 wt % of the combined weight of matrix resin and said particles.

14. The composite structure of claim 11 wherein said resin matrix comprises at least one epoxy resin, an aromatic diamine hardener, and at least one thermoplastic.

* * * * *